Patented Mar. 4, 1941

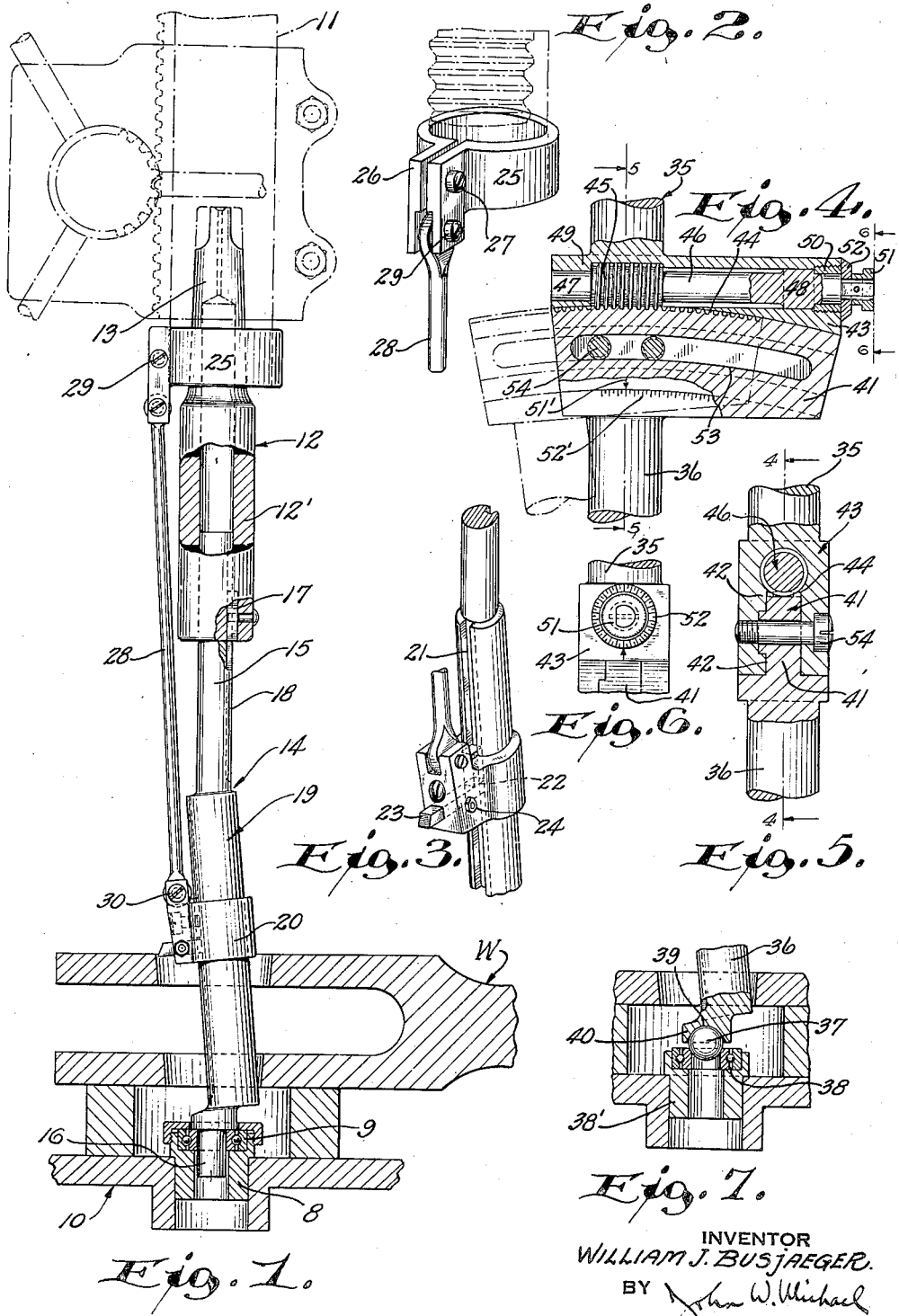

2,234,039

UNITED STATES PATENT OFFICE 2,234,039

TAPER BORING BAR

William J. Busjaeger, Milwaukee, Wis.

Application November 17, 1939, Serial No. 304,978

9 Claims. (Cl. 77—57)

This invention relates to an improvement in boring machines, especially designed and adapted for boring or finishing tapered holes or openings in machine parts.

One of the principal objects of the invention is to provide a machine of this character, which is simple and compact in construction, which is practical and efficient in operation, and which substantially facilitates the operation of boring or finishing a tapered hole or opening in a metal machine element.

Another object of the invention is to provide a machine of this character, which may be readily combined with an ordinary upright drilling machine or drill press, usually available in machine shops.

A still further object of the invention is to provide a boring machine having these advantages and capacities, and which is adjustable to bore tapered openings of various sizes.

Another object of the invention is to provide a machine of this character and having these advantages which makes it convenient and practical to bore or finish tapered holes in machine elements with precision and at a very rapid rate. The operation is not only greatly speeded up, but the work required of the machinist is materially lessened. Both time and labor are saved and a superior product is had.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a view partly in front elevation and partly in transverse vertical cross section, showing a boring bar constructed in accordance with the present invention, and combined with an ordinary or conventional drill press or upright drilling machine.

Figure 2 is a fragmentary perspective view showing the collar which is clamped about the coupling socket attached to the drilling machine spindle and the upper portion of the link, which is combined with the collar for the purpose of feeding the tool holder along the boring bar.

Figure 3 is a fragmentary perspective view illustrating a portion of the boring bar and showing the tool-holder and tool combined therewith and also the lower portion of the feed link.

Figure 4 is a view in transverse vertical cross section taken on the line 4—4 of Figure 5 and showing a modification of construction which provides an adjustment to make it practical to bore tapered holes of different sizes.

Figure 5 is a view in vertical cross section taken on line 5—5 of Figure 4.

Figure 6 is a detailed view in end elevation of the part of the structure shown in Figure 5, Figure 6 being taken on line 6—6 of Figure 4; and Figure 7 is a fragmentary view partly in side elevation and partly in vertical cross section, showing the type of bearing employed for supporting the lower end of the boring bar when the bar is constructed as illustrated in Figures 4 to 6, inclusive.

Referring to the drawing, the numeral 10 designates the work table or an upright drilling machine or drill press. The work to be bored is designated by W, and is suitably held in position on the work table or on supports provided for it on the work table. Overlying the work table is the spindle 11 of the drill press, which, in accordance with conventional practice, is rotated from a motor or suitable source of power, and is also fed axially.

The present invention proposes to interconnect with the spindle 11 a coupling sleeve, designated generally at 12, the shank 13 of the coupling sleeve being interfitted with and rotatably coupled to the spindle 11 in the usual way so that the coupling sleeve is not only rotated with the spindle but is also fed axially therewith.

In one form of the invention a boring bar, designated generally at 14, is provided, and has its upper and lower ends, designated at 15 and 16, respectively coaxially disposed. The lower end 16 of the boring bar is suitably machined to interfit with and be supported by the inner race of a ball bearing assembly 9. Ball bearing assembly 9 is carried by a suitable bearing holder or support 8 provided on the work table 10. The upper end 15 of the boring bar is a sliding fit in the socket 12' of the coupling sleeve 12. Means is provided for causing the boring bar to rotate with the coupling sleeve, and consequently also with the spindle of the drilling machine, and may comprise a key or spline 17 suitably fastened to the inside wall of the socket 12', and fitted in a key-way or groove 18 formed in the upper end 15 of the boring bar. The boring bar 14 also has an inclined portion 19 disposed between the upper and lower ends, and in the construction illustrated in Figure 1 its inclined portion is machined as an integral part of the boring bar, that is it is integral with the ends 15 and 16 thereof. As shown in the drawing, this inclined portion 19 is disposed at an angle to the common axis to the ends 15 and 16 of the boring bar, or in other words at an angle to the axis of rotation of the boring bar.

A tool-holder 20 is slidably fitted on this inclined portion 19, and although free to slide thereon is constrained to rotate therewith. For this purpose the inclined portion 19 may be provided with a groove or key-way 21 in which a key or spline 22 suitably fastened on the tool-holder is slidably fitted. A suitable boring tool, designated at 23, is mounted in a socket provided therefor in the tool-holder 20, and is releasably secured in position in any suitable fashion, as for example by set screw 24.

Means is provided for causing the tool-holder 20 and its tool 23 to be fed along the inclined portion 19 as the boring operation progresses, and this feeding means may conveniently take the form of a collar 25, which surrounds and is clamped to a portion of the shank 13 of the coupling socket just below the spindle 11. The collar 25 may be, as is shown in the drawing, split, and is provided with flanges 26 at the split. A clamping screw 27 coacts with these flanges to secure the collar to the shank of the coupling sleeve. A feed link 28 is provided, and has one end pivotally connected, as at 29, to the flanges 26, and has its opposite end pivotally connected, as at 30, to the tool-holder 20.

With this construction, when work is set up, and the spindle 11 driven, the tool-holder 20 and its tool 23 are not only rotated, but are fed axially along the inclined portion 19 of the boring bar. As the tool-holder and its tool move along the inclined portion of the boring bar, the point of the tool approaches the axis of rotation of the boring bar and hence cuts or finishes a tapered hole in the work.

Figures 4 to 7 illustrate a modification of the construction herewith described, and is designed to provide adjustments which facilitate changing the angle of the inclined portion of the boring bar to its axis of rotation, thereby adapting the machine to bore tapered openings of various or different sizes.

In the form shown in Figures 4 to 7, the boring bar is made up of an upper section 35 and a lower section 36. The upper section 35 is interconnected with a coupling socket identical with socket 12, so that it is rotated with the spindle of the drill press although the spindle 11 and its coupling socket 12 may partake of a feeding relative thereto. In this modification the lower end of the lower section 36 is mounted on the work table by a universal bearing which may take the form of a ball bearing 37 mounted on the inner race of a ball bearing assembly 38 supported on the work table by a bearing holder 38', the ball bearing 37 being fitted in a concaved recess 39 provided in an offset foot portion 40 formed at the lower end of the lower section 36 of the boring bar.

Means is provided for adjustably interconnecting the adjacent ends of the upper and lower sections 35 and 36 of the boring bar. For this purpose the lower section 36 is formed with a head portion 41, which generally has the form of an inverted T, and which is interfitted in a transverse guide-way 42 formed in an enlargement 43, which is integral with the lower end of the upper section 35. The upper edge of the head 41 is arcuate and is provided with threads 44 which are engaged by threads 45 of an adjusting screw 46. This screw 46 is rotatably mounted in a suitable opening provided therefor in the enlargement 43 above its guideway. Bearing portions 47 and 48 on the shank in the screw provide for its rotation. The screw is held against axial movement by virtue of the engagement of the shoulder 49 thereon with an internal shoulder in the enlargement 43, and also by means of a bushing 50 provided at one end of the opening which receives the screw. A knob 51 is fixed to one end of the screw, which projects beyond the enlargement and facilitates turning thereof. A dial 52 may be combined with the knob to facilitate precision adjustment. Control over the adjustment is further facilitated by the provision of a scale 52' on the portion of the head 41 below the enlargement 43 and a cooperable pointer or arrow 51' on the enlargement (see Fig. 4).

For the purpose of releasably securing the parts in any selected adjustment the T-shaped head 41 has an arcuate slot 53 therein. Clamping bolts or studs 54 are combined with the opposite sides of the enlargement 43 and extend through this slot 53. When the bolts are tightened up the parts are securely held in any adjustment, but when they are backed off the adjustment may be effected.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. A taper boring device for use with machine tools of the type having a work table, a spindle supported above said table for rotation and for axial feeding movement and comprising a boring bar having coaxial ends and an intermediate portion rotatable with the ends but disposed at an angle to the common axis of the ends, a bearing on the work table on which the lower end of the boring bar is rotatably supported, a coupling socket secured to the spindle and splined to the upper end of the boring bar, a tool-holder slidably supported on the inclined portion of the boring bar and constrained to rotate therewith, a tool carried by said holder, and a link connecting the coupling socket with the tool-holder so that as the spindle and coupling socket are fed downwardly the tool-holder and its tool are correspondingly fed.

2. A boring bar of the character described for use with machine tools of the type including a work table and a spindle which is rotated and fed and comprising a bearing supported on the work table, a boring bar having coaxial ends and an intermediate portion disposed at an angle to the common axis of the ends, a tool-holder slidably mounted on said intermediate portions and constrained to rotate therewith, the lower end of the boring bar being rotatably interfitted with said bearing, means coacting with the upper end of the boring bar and with the spindle to cause the boring bar to rotate with the spindle but leaving the spindle free to feed relative to the boring bar, and means connecting the spindle and tool-holder to transmit feeding motion of the spindle to the tool-holder.

3. A taper boring bar for use with machine tools of the type having a work table and a spindle supported above the work table for rotation and for feeding movement and comprising a ball bearing assembly mounted on the work table, a boring bar having coaxial ends and also having an intermediate portion disposed at an angle to the common axis of said ends, a tool-holder splined to said intermediate portion of the boring bar for movement axially thereof, a coupling socket having a tapered shank fixed to the spindle and having its socket telescoped over and splined to the upper end of the boring bar, a collar fixed to the shank of the coupling socket just below the spindle, and a link having one end pivotally connected to the collar and having its opposite end pivotally connected to the tool holder to effect feeding of the tool-holder from the spindle.

4. A taper boring device for use with machine tools of the type having a work table, a spindle supported above the table for rotation and for axial feeding movement and comprising a boring bar, a bearing on the work table coacting with the lower end of the boring bar to support the same for rotation, means for rotatively coupling the spindle to the upper end of the boring bar while providing for feeding of the spindle relative thereto, said boring bar having a portion disposed at an angle to the axis of the spindle, a tool-holder splined on said angle portion of the boring bar for movement axially thereof, means interconnecting the spindle and the tool-holder to impart feeding movement of the spindle to the tool-holder.

5. A taper boring device for use with machine tools of the type having a rotatable and axially fed spindle and comprising a boring bar having upper and lower sections, means interconnecting the adjacent ends of the sections to rotatively couple them together and to provide for angular adjustments of the lower section relative to the other section, means for effecting said adjustment and maintaining the sections in any selected adjustment, a universal bearing supporting the lower end of the lower section, means coacting with the upper section for rotating it, a tool-holder splined on the lower section for movement axially thereof, a tool carried by said holder, and means imparting the feeding movement of the spindle to the tool-holder.

6. A taper boring bar of the character described comprising upper and lower sections provided with coaxial ends, a slotted enlargement on the lower end of the upper section, a guide head integral with the upper end of the lower section and slidably interfitted with said slot for adjustment of the angular relation between the upper and lower sections, said guide head having an arcuate slot and being provided with threads on its upper surface, an adjusting screw mounted on the enlargement and meshing the threads of the guide head for effecting angular adjustment between the sections, and means carried by the enlargement and extending through the slot of the head for clamping the sections in any selected adjustment.

7. A taper boring machine of the character described comprising a work table, a spindle supported above said table for rotation and feeding movement, a boring bar, a bearing on the table supporting the lower end of the boring bar for rotation, a coupling sleeve connected to the spindle and splined to the upper end of the boring bar, said boring bar having a portion inclined to the axis of the spindle, a tool-holder splined on the inclined portion of the boring bar for movement axially thereof, a tool carried by said tool-holder, a collar fixed to the coupling sleeve, and a link having one end pivotally interconnected with the collar and its other end pivotally connected with the tool-holder.

8. A taper boring machine of the character described comprising a rotary and axially movable spindle, a boring bar, a coupling sleeve connected to the spindle and splined to the upper end of the boring bar, said boring bar having a portion inclined with respect to the axis of the spindle, a tool-holder splined on the inclined portion of the boring bar for movement axially thereof, a tool carried by said tool-holder, and means for imparting the axial movement of the spindle to the tool-holder to feed it along the inclined portion of the boring bar.

9. A taper boring machine of the character described comprising a rotary and axially movable spindle, a boring bar, a coupling sleeve connected to the spindle and splined to the upper end of the boring bar, said boring bar having a portion inclined with respect to the axis of the spindle, a tool-holder splined on the inclined portion of the boring bar for movement axially thereof, a tool carried by said tool-holder, a collar fixed to the coupling sleeve, and a link having one end interconnected with the collar and its other end interconnected with the tool-holder whereby to impart axial movement of the spindle to the tool-holder to feed the tool-holder along the inclined portion of the boring bar.

WILLIAM J. BUSJAEGER.